United States Patent
Jiang (10) Patent No.: US 9,098,816 B2
(45) Date of Patent: Aug. 4, 2015

(54) MESSAGE LOSS PREVENTION IN CAN SYSTEMS

(75) Inventor: Shengbing Jiang, Rochester Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1485 days.

(21) Appl. No.: 12/353,772

(22) Filed: Jan. 14, 2009

(65) Prior Publication Data

US 2010/0180003 A1 Jul. 15, 2010

(51) Int. Cl.
G06Q 10/06 (2012.01)
H04L 12/40 (2006.01)

(52) U.S. Cl.
CPC ...... *G06Q 10/06* (2013.01); *G05B 2219/25032* (2013.01); *H04L 2012/40215* (2013.01)

(58) Field of Classification Search
USPC ............ 709/208, 236, 248; 370/254; 375/130
See application file for complete search history.

(56) References Cited

U.S. PATENT DOCUMENTS

| | | | | |
|---|---|---|---|---|
| 4,709,347 | A * | 11/1987 | Kirk ............................. | 709/248 |
| 5,632,017 | A * | 5/1997 | Klein et al. ................... | 709/249 |
| 6,111,888 | A * | 8/2000 | Green et al. .................. | 370/461 |
| 6,609,163 | B1 * | 8/2003 | Nguyen et al. ................ | 710/21 |
| 6,636,100 | B1 * | 10/2003 | Shingaki ...................... | 327/388 |
| 6,845,416 | B1 * | 1/2005 | Chasmawala et al. ........ | 710/107 |
| 7,009,995 | B1 * | 3/2006 | Bohrer et al. ................. | 370/460 |
| 7,046,638 | B1 * | 5/2006 | Klausner et al. ............. | 370/313 |
| 7,089,333 | B2 * | 8/2006 | Marinescu et al. ........... | 709/248 |
| 7,289,446 | B2 * | 10/2007 | Itoi .............................. | 370/235 |
| 7,426,190 | B2 * | 9/2008 | Manjeshwar et al. ........ | 370/254 |
| 7,466,717 | B1 | 12/2008 | Weigl | |
| 7,738,462 | B2 * | 6/2010 | Hwang ..................... | 370/395.1 |
| 2003/0070019 | A1 | 4/2003 | Dalakuras et al. | |
| 2005/0066062 | A1 * | 3/2005 | Hartwich ......................... | 710/1 |
| 2007/0255855 | A1 * | 11/2007 | Knapp et al. .................. | 709/248 |
| 2007/0271204 | A1 * | 11/2007 | Jiang ............................... | 706/6 |
| 2008/0198868 | A1 * | 8/2008 | Fuehrer ........................ | 370/442 |
| 2009/0178486 | A1 * | 7/2009 | Klee et al. ...................... | 73/629 |
| 2010/0180003 | A1 * | 7/2010 | Jiang ............................. | 709/208 |

OTHER PUBLICATIONS

Gergeleit, Martin et al., Implementing a Distributed High Resolution Real-Time clock using CAN-Bus, 1st Internation CAN conference, pp. 1-7.*
Wikipedia, Controller Area Network, pp. 1-9.*

(Continued)

*Primary Examiner* — Backhean Tiv
(74) *Attorney, Agent, or Firm* — John A. Miller; Miller IP Group, PLC (57) ABSTRACT

A method for message loss prevention in a CAN system. The CAN system includes a plurality of distributed nodes, such as electronic control unit nodes that communicate with each other through a CAN bus. The distributed nodes are categorized into a first type node or a second type node. Further, each distributed node has its own task period which is the time taken by a node to complete a task allocated to it. First, a synchronization frequency is determined. Synchronization frames are sent to the second type node by the first type node at the synchronization frequency. Hereafter, task activation synchronization is performed on the second type node based on information included in the synchronization frames where the task activation synchronization is performed by adjusting the task period of the second type node.

18 Claims, 6 Drawing Sheets

(56) References Cited

OTHER PUBLICATIONS

Frank Schmuck, Flaviu Cristian, Continuous Clock Amortization Need Not Affect the Precision of a Clock Synchronization Algorithm, Proceedings of the Ninth Annual ACM Symposium on Principles of Distributed Computing, p. 133-143, Aug. 22-24, 1990, Quebec City, Quebec, Canada.

Goran Frehse, PHAVer: Algorithmic Verification of Hybrid Systems past HyTech, Dept. of Electrical and Computer Engineering, Carnegie Mellon University, Pittsburgh, Pennsylvania.

William Henderson, David Kendall, Adrian Robson, Accounting for Clock Frequency Variation in the Analysis of Distributed Factory Control Systems, WFCS, Sep. 6-8, 2000, Porto, Portugal.

Thomas A. Henzinger, The Theory of Hybrid Automata, Electrical Engineering and Computer Sciences, University of California at Berkeley, 1996, California.

Thomas A. Henzinger, Pei-Hsin Ho, Howard Wong-Toi, HyTech: A Model Checker for Hybrid Systems, Electrical Engineering and Computer Sciences, University of California at Berkeley, 1997, California.

Martin Gergeleit, Herman Stretch, Implementing a Distributed High-Resolution Real-Time Clock Using the CAN-Bus, 1st Int'l Can Conf., Mainz, Germany, 1994.

* cited by examiner

MESSAGE LOSS PREVENTION IN CAN SYSTEMS

BACKGROUND OF THE INVENTION

1. Field of the Invention

This invention relates generally to a controller area network (CAN) that controls transmission of information between a plurality of electronic control units (ECU) located within a vehicle and, more particularly, to an information loss prevention technique used in a CAN system.

2. Description of the Related Art

Modern times have seen the use of various innovative features in automobiles. These features include adaptive cruise control, collision avoidance and stability control systems. Implementation of such systems typically includes the use of a distributed controller area network (CAN) system having a plurality of electronic control unit (ECU) nodes and a CAN bus for transmission of messages between these nodes. In the distributed CAN system, normally there is no clock synchronization among the ECU nodes. Due to lack of synchronization, the clocks of the ECU nodes drift away from each other. Typically, at a clock drift rate of ±30 ppm (parts per million) at a standard temperature (77° F.), a clock could drift by 108 milliseconds in one hour. This drifting of clocks can cause message loss in the CAN system, which could have serious implications. Further, a sequence of messages could get lost in the CAN system due to a combination of other factors in addition to clock drift, such as finite buffer size, transmission jitter, etc.

One existing approach to prevent message loss includes over sampling so that a single message loss may not effect the functioning of the system. However, this approach cannot be used to overcome a sequence of message losses. This is because in order to overcome a sequence of n message losses, the sampling rate and the software task execution period should be n times faster. This is generally impossible in cases where n≥3 because of a large consumption of resources and hardware restrictions.

Another approach to prevent message loss is to provide a digital clock for each ECU node and to synchronize these clocks. However, clock synchronization may have a high overhead because those synchronizations are usually performed about every 15 ms (millisecond) for a drift rate of ±30 ppm and some synchronization mechanisms require specific hardware circuits. Currently, the operating system for task activation is based on the quartz crystal clock of the ECU nodes rather than the digital clock. So, in order to prevent message loss in the system through this approach a customized operating system is needed to be used with the digital clocks.

SUMMARY OF THE INVENTION

In accordance with the teachings of the present invention, a method for message loss prevention in a CAN system is disclosed that has particular application for the various control features used in vehicles, such as adaptive cruise control, collision avoidance and stability control systems. The method uses a CAN system that includes a plurality of distributed nodes that communicate with each other through a CAN bus. The distributed nodes are categorized into a first type node or a second type node. Further, each distributed node has its own local task period, which is the time taken by a node to complete a task allocated to it. A synchronization frequency is determined, and synchronization frames are sent to the second type node by the first type node at the synchronization frequency. Thereafter, task activation synchronization is performed on the second type node based on information included in the synchronization frames where the task activation synchronization is performed by adjusting the task period of the second type node.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for message loss prevention in a CAN system is merely exemplary in nature, and is in no way intended to limit the invention or its applications or uses. For example, the method for message loss prevention in CAN system of the invention has particular application in adaptive cruise control, collision avoidance and stability control systems used in vehicles. However, as will be appreciated by those skilled in the art, the method for message loss prevention in a CAN system of the invention may have other applications.

Figure 1:
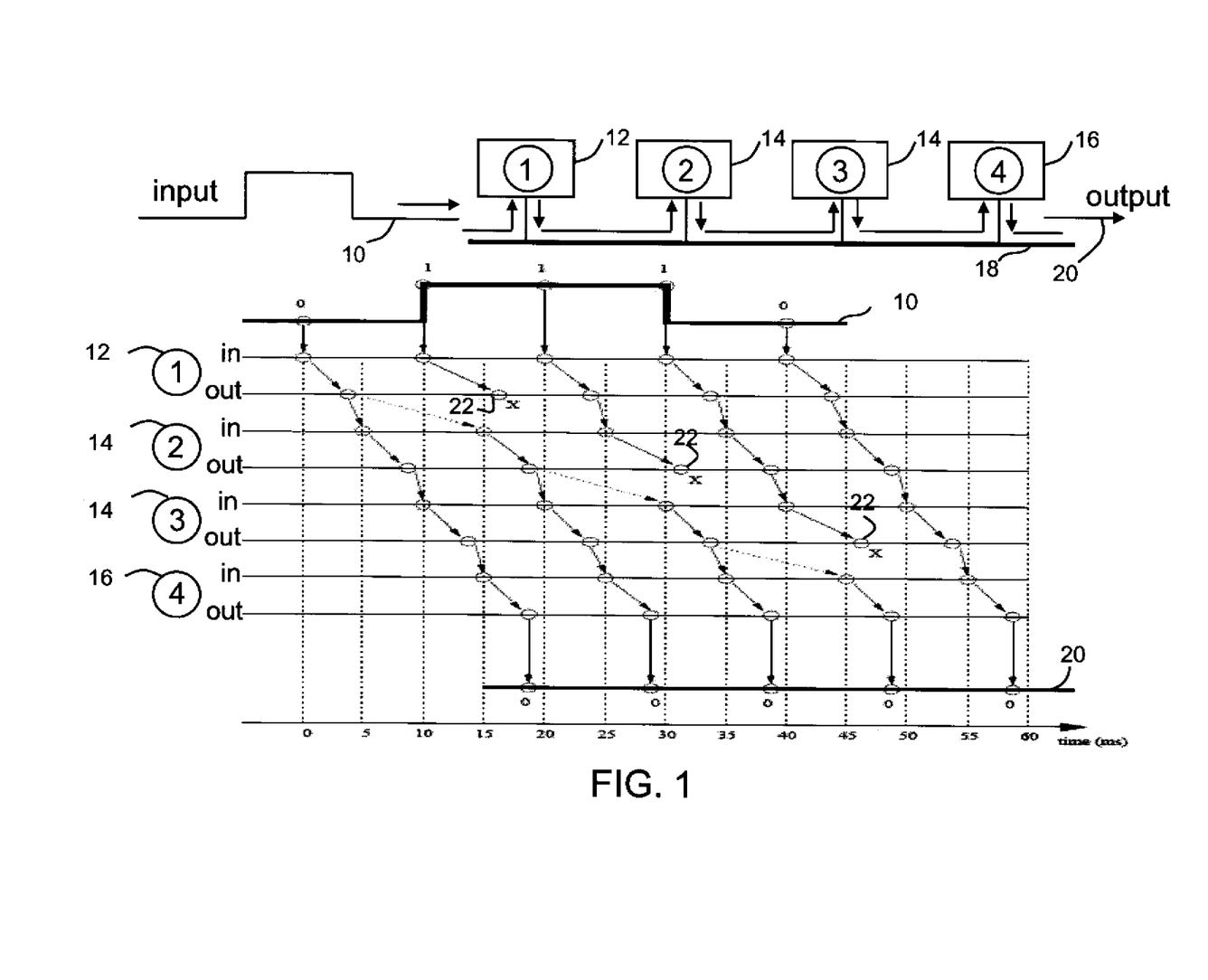
FIG. 1 illustrates a distributed controller area network (CAN) system showing message loss due to clock drifts.

FIG. 1 illustrates an exemplary situation depicting message loss in a CAN system due to clock drifts, finite buffer size and transmission jitters. The CAN system includes a plurality of nodes 12, 14 and 16 that are able to communicate with each other through a CAN bus 18, where the node 12 is the first node, the node 16 is the last node and the nodes 14 are intermediate nodes. The nodes 12, 14 and 16 are ECU nodes, with each node having its own local clock. Further, the nodes 14 and 16 have a buffer of finite size of one to store information received from the previous node. Each node is allocated a task that it completes periodically when its clock measures time units equal to the task period or the task activation time, hereinafter used interchangeably. Here, a task is said to be completed when the node produces an output based on an input. The task period is the time between the two consecutive invocations of the task. In this exemplary situation, it is assumed that the task period is 10 milliseconds (ms) and the release phase, that is, the time lag between the initiations of tasks in their corresponding nodes, is zero. To take into consideration transmission jitter, the best case and the worst case task execution time of every task is assumed to be 4.9 ms and 5.1 ms, respectively.

As shown in FIG. 1, an input 10 is fed into the first node 12 and an output 20 is observed at the last node 16. It is shown that an output sequence (0→0→0→0→0) is obtained for an input sequence (0→1→1→1→0). It can be clearly observed that consecutive message loss at locations 22 occurs at nodes 12 and 14 due to replacement of an unconsumed old message by a new message.

Figure 2:
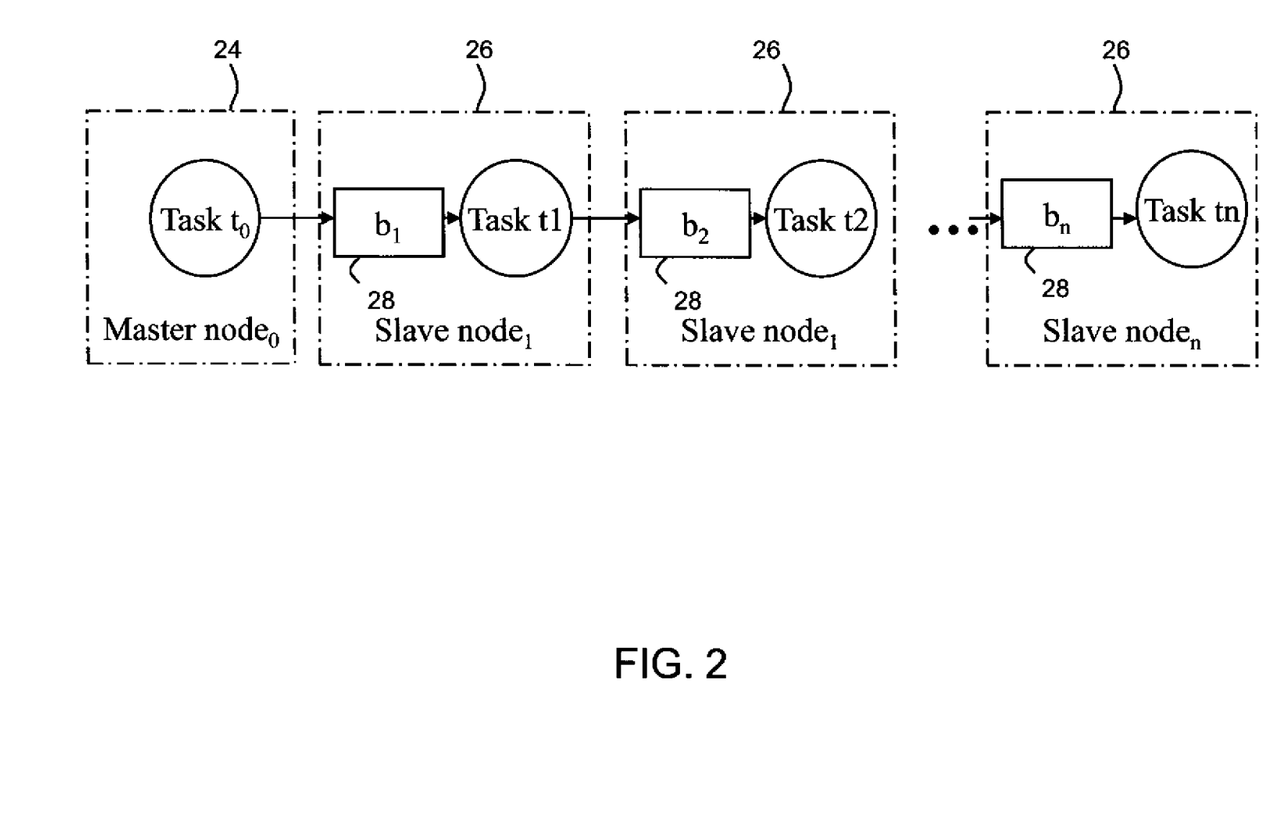
FIG. 2 illustrates a block diagram of a method for preventing message loss in a distributed CAN system.

FIG. 2 illustrates a block diagram of a method for preventing message loss in a distributed CAN system. The nodes included in the CAN system are of two types, namely, a first type node 24, also known as a master node, and a second type node 26, also known as a slave node 26. Each of the nodes in the CAN system are distributed node because they perform the task allocated to it independently. The master node 24 is usually the first node and all successive nodes are the slave nodes (slave node$_0$, slave node$_1$ . . . slave node$_n$). The master node 24 is allocated a task $t_o$ and the slave nodes 26 are allocated tasks $t_1, t_2 \ldots t_n$. Further, each node has a local clock for its local task period. All of the slave nodes 26 have a buffer 28 represented by $b_1, b_2 \ldots b_n$. The buffer 28 is used to store the message received from the previous node.

The master node 24 periodically sends a synchronization frame that contains information about the time interval after which a synchronization frame is sent by the master node 24 measured in reference to the local clock of the master node 24. Further, upon receiving the synchronization frame, each slave node 26 adjusts its task activation time t according to the information received in the synchronization frame, as will be described later in FIG. 7. This operation of adjusting the task activation time t is known as task activation synchronization. Prior to performing the operation of task activation synchronization, a synchronization frequency is determined. The synchronization frequency is the frequency at which synchronization frames are sent to the slave nodes 26 by the master node 24. To determine the synchronization frequency, a model of the CAN system in the form of a linear hybrid automaton (LHA) is used. The synchronization frequency is determined in such a way so that the CAN system has no message loss and has low overhead. This process of determining the synchronization frequency is described below and is an offline process, i.e, it is performed during the design phase of the CAN system so that the model can be tested for various frequency parameters.

The LHA has a test frequency 1/N' as one of its parameter, where N' is an integer. Hence, the task activation synchronization is performed in the model after every time (N')*T, where T is the task period. The initial test frequency is chosen such that it is the highest frequency that the LHA can accept under the given system resource constraints. Hereafter, a formal verification is performed for LHA to observe the state of message loss with the initial test frequency. Now, the initial test frequency is reduced by a factor and the task activation synchronization is performed at this new frequency. In one non-limiting embodiment, the test frequency is reduced by a factor of two. Again, the step of formal verification is carried out to observe the message loss state at the new test frequency. The above mentioned steps of iterative reduction of the test frequency, task activation synchronization at the reduced test frequency and formal verification are repeated until a message loss is observed. Now, the test frequency of a step just preceding the step at which the first message loss occurred, which is also the lowest frequency at which there is no message loss, is termed as the synchronization frequency and is denoted by 1/N. However, if a message loss is observed in the first iteration then the system schedule is revised because the schedule itself is not robust enough and a small clock drift would cause message loss.

Figure 3:
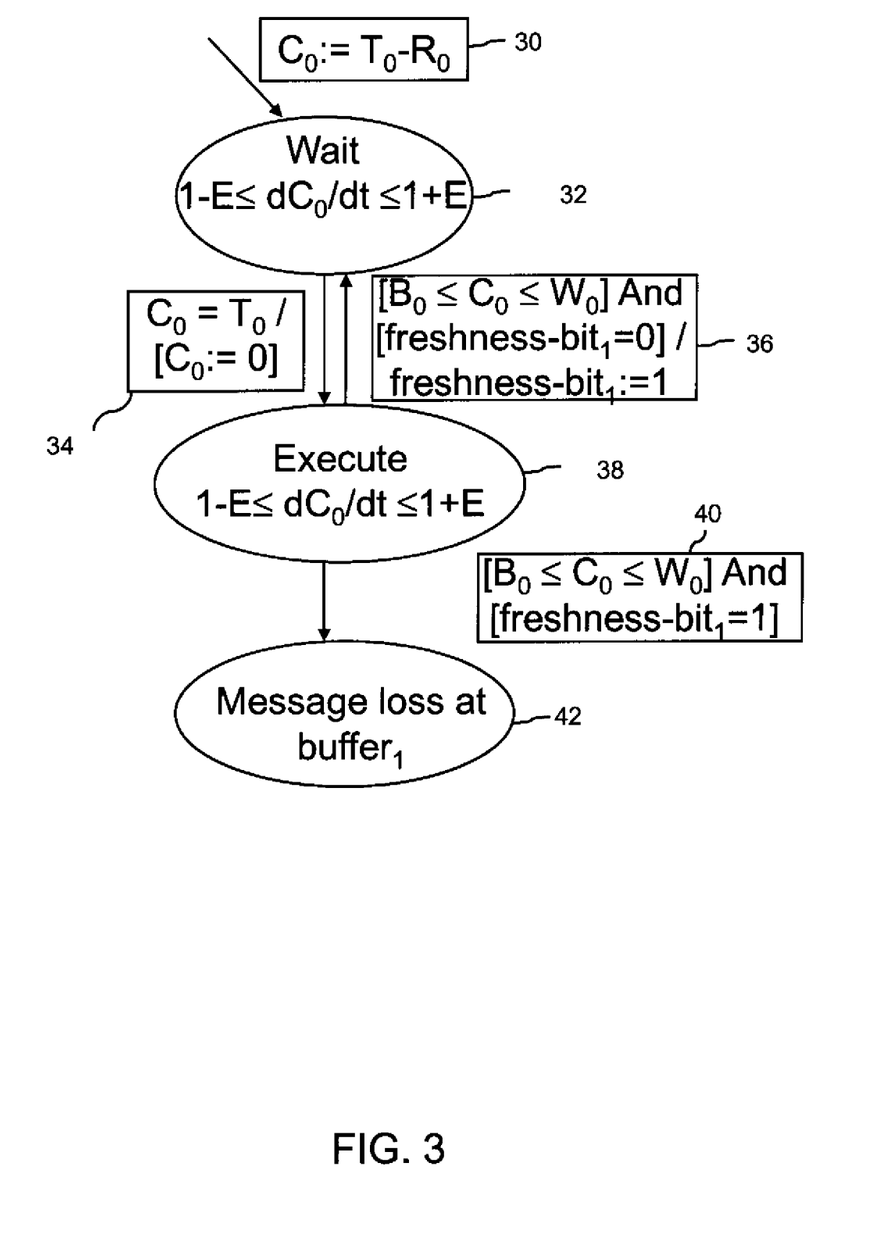
FIG. 3 illustrates a flow diagram depicting the execution of a task at a master node.

FIG. 3 illustrates a flow diagram depicting the execution of task to on the master node 24. Here, $B_0$ is the best case execution time, $W_0$ is the worst case execution time and freshness-bit$_1$ gives the status for the buffer $b_1$ 28. The freshness-bit is used to indicate whether the data in the corresponding buffer 28 has been consumed by its associated node or not. The value of the freshness-bit$_1$ is 0 if the data in the buffer 28 has been consumed or 1 if the data in the buffer 28 has not been consumed. Initially, the task $t_0$ is in a "wait" state at step 32. The local clock variable is the time unit measured by a local clock of the corresponding node. The local clock variable of the master node 24 is shown to be $C_0$ and is equal to the difference between $T_0$ and $R_0$ as indicated at box 30. Here, $T_0$ is the local task period of the master node 24 and is equal to the task period T where $R_0$ is the release phase.

In general, the local task period of a node is the task period measured by the corresponding local clock in reference to the local clock of the master node. Hence, it can be said that after task activation synchronization takes place the local task periods of all the nodes, in reference to the local clock of the master node, will be equal to the common task period for all the nodes T. The local clock of the master node is shown to have a drift rate of E. Hence, the flow function for the local clock is $1-E \leq dC0/dt \leq 1+E$. When the local clock variable $C_0$ attains the value $T_0$, as indicated at box 34, a transition takes place from the "wait" state 32 to an "execute" state 38, where the task of the master node 24 begins execution and $C_0$ is reset to zero. Further, from the "execute" state 38, the process could go back to the "wait" state 32 if the value of $C_0$ lies between $B_0$ and $W_0$ and the freshness-bit$_1$ is equal to zero. In this case, the freshness-bit$_1$ is reset to one. However, if the value of $C_0$ lies between the values $B_0$ and $W_0$ and the freshness-bit$_1$ is equal to one, then the process goes to state 42 where a message loss at buffer $b_1$ is indicated.

Figure 4:
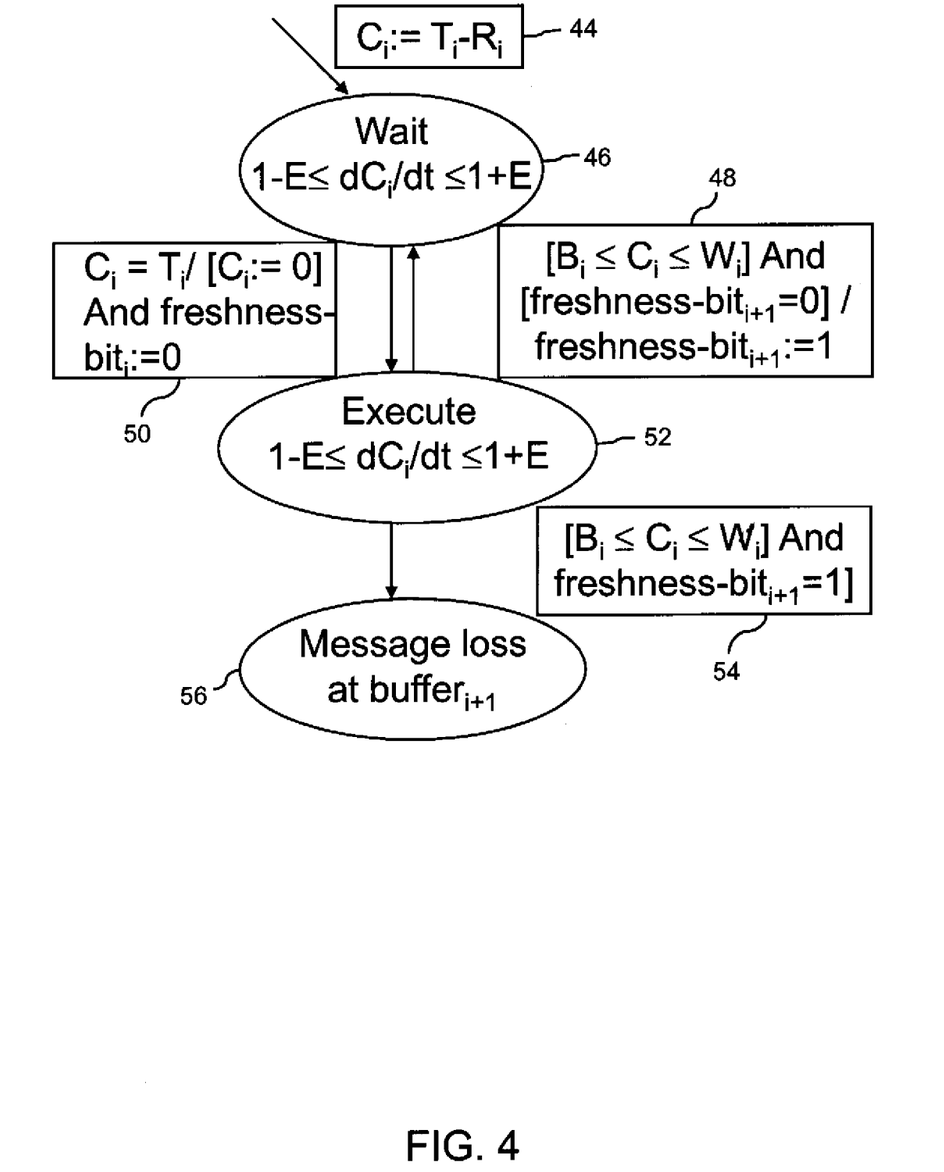
FIG. 4 illustrates a flow diagram depicting the execution of a task at a slave node.

FIG. 4 illustrates a flow diagram depicting the execution of task $t_1$ on the slave node$_1$ 26, where i=1, 2 . . . , (n-1). The process here is similar to the process of completing task $t_0$ as described in FIG. 3 except that when a transition take place from the "wait" state 46 to the "execute" state 52, the freshness bit for buffer $b_i$ (i=1, 2, . . . , (n-1)) is reset to zero, as indicated at box 50.

Figure 5:
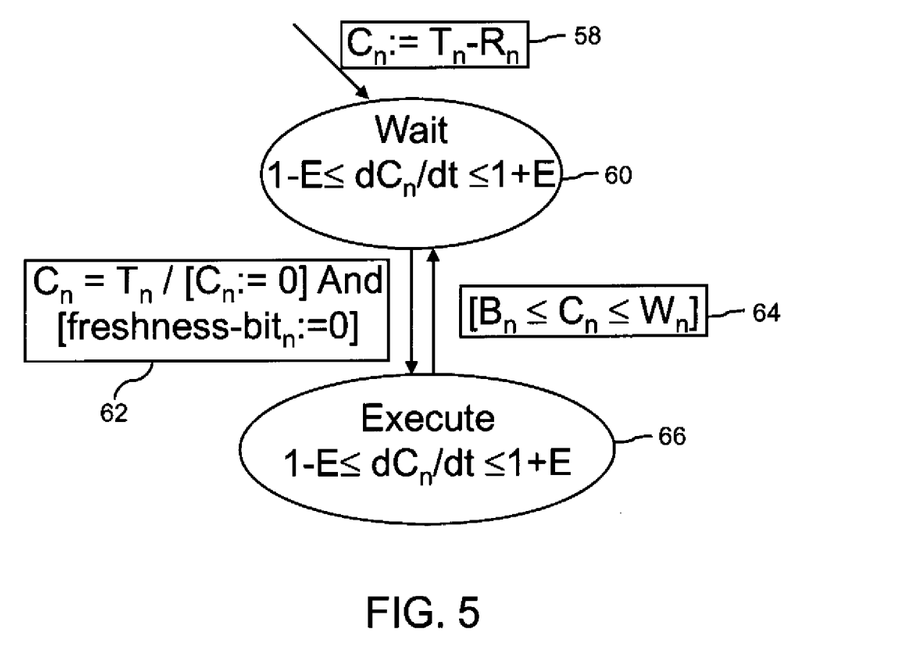
FIG. 5 illustrates a flow diagram depicting the execution of a task at the last slave node.

FIG. 5 illustrates a flow diagram depicting the execution of task $t_n$ on the slave node$_n$ 26. The process here is similar to the process of completing task $t_0$ as described in FIG. 3 except that there is no buffer after the slave node$_n$ 26 and as a result there is no message loss condition.

Figure 6:
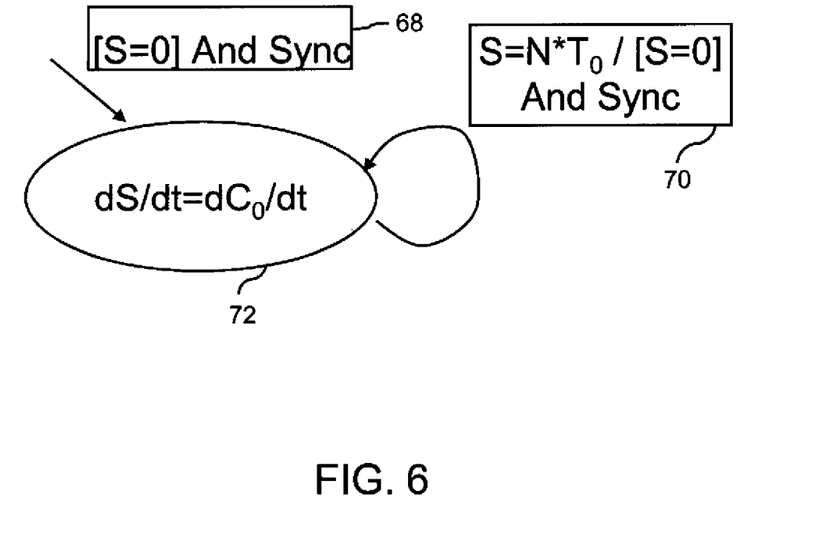
FIG. 6 illustrates a flow diagram depicting the method for performing task activation synchronization at the master node.

FIG. 6 illustrates a flow diagram depicting the task activation synchronization model for the master node$_0$ 24. Here, the time interval between two synchronizations is denoted by S. Further, the synchronization frequency is as described in FIG. 2 and $C_0$ is as described in FIG. 3. Initially, the synchronization frame is sent out by the master node$_0$ 24 and is denoted by "Sync", and the variable S is set to zero at box 68. Further, after every N*T time units, that is, when S=N*$T_0$, as indicated at box 70, the master node$_0$ 24 sends a synchronization frame to the slave nodes 26. The self transition loop of sending synchronization frames by the master node 24 has been indicated at step 72. At the box 70, $T_0$ is the task period of the master node 24 and is equal to the task period T, and hence, it can be said that the master node sends out a synchronization frame when the condition N*$T_0$=N*T is satisfied.

Figure 7:
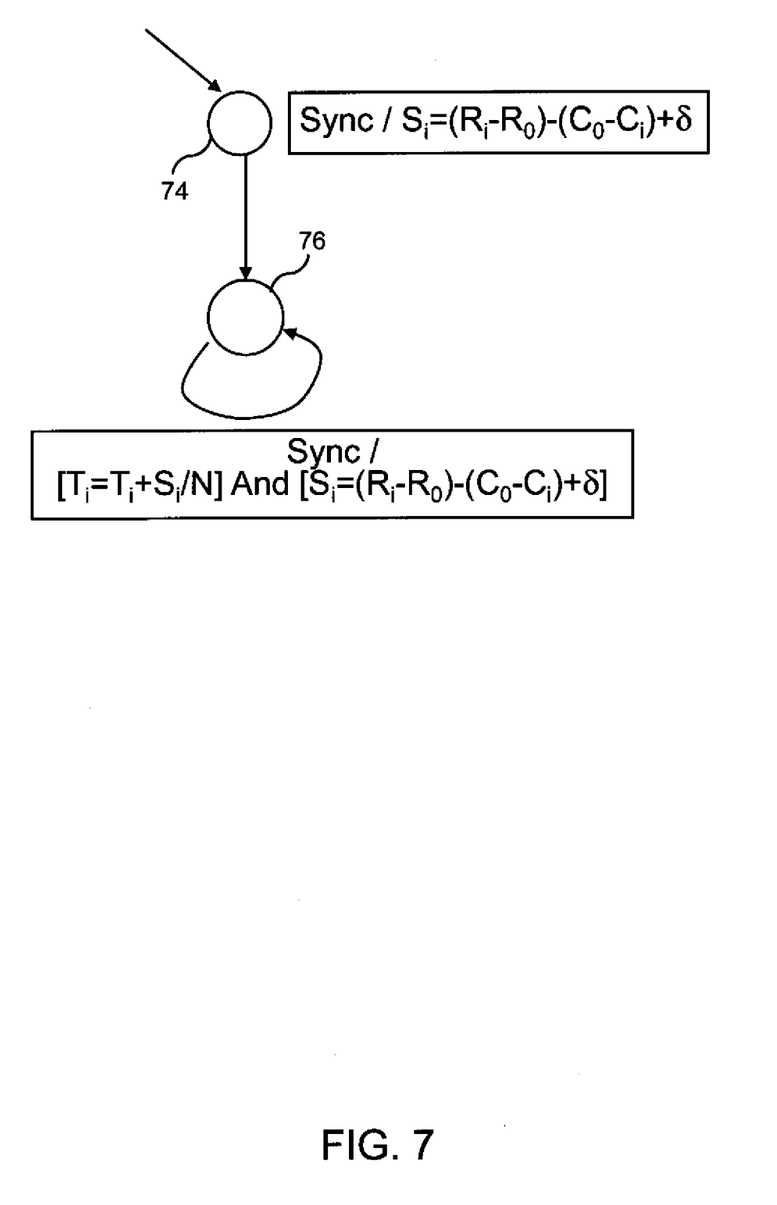
FIG. 7 illustrates a flow diagram depicting a method for performing task activation synchronization at the slave node.

FIG. 7 illustrates a flow diagram depicting the task activation synchronization model for the slave node$_i$ (here i= 1, 2 . . . (n-1)). When the slave node$_i$ 26 receives a synchronization frame from the master node$_0$ 24, it computes the activation time drift $S_i$ of task $t_i$ (here i=1, 2, . . . , (n-1)) with respect to $t_0$. Here, $S_i$ is computed using the formula $S_i=(R_i-R_0)-(C_0-C_i)+\delta$. Here, $R_0$ and $C_0$ are as described in FIG. 3, and $R_i$ and $C_i$ are similar parameters for the $i^{th}$ slave node. It can be deduced that $S_i$ is the difference between the task period T and the local task period $T_i$ of the $i^{th}$ slave node. Further, the slave node$_i$ 26 adjusts the task activation period of task $t_i$ based on the value of received synchronization frames, as indicated at box 76.

Further, it can be seen that the time difference between the subsequent activations of $t_i$ and $t_0$ because of the release phases would be $(R_i-R_0)$. As discussed above, $S_i$, $C_0$ and $C_i$ are the respective values of the time that has passed since the last activation of $t_0$ and $t_i$, until the current synchronization point, so $T_0-C_0$ and $T_i-C_i$ would be the respective values of the next activation of $t_0$ and $t_i$, which further implies $(T_i-C_i)-(T_0-C_0)=(C_0-C_i)+(T_i-T_0)$ is the difference between the next activations of $t_0$ and $t_i$. So, the activation drift will be $(R_i-R_0)-(C_0-C_i)-(T_i-T_0)$. Here, the actual recording of the above $C_0$ and $C_i$ are performed by the master node$_0$ 24 upon successful transmission of the synchronization frame and the slave node 26 on receiving the synchronization frame, so that these recording happen simultaneously. In addition to this, there would be a system implementation error δ so the activation time drift would be $S_i=(R_i-R_0)-(C_0-C_i)+δ$. Hereafter, the task activation period $T_i$ of task $t_i$ is adjusted using the equation $T_i=T_i+S_i/N$ so that the clock drift can be reduced and message loss can be prevented.

Various embodiments of the present invention offer one or more advantages. The present invention provides a method to prevent message loss in CAN systems which are used in automotive vehicles. The method in the present invention is used to perform task activation synchronization on the ECU nodes so the message loss due to clock drift, finite buffer size and jitter in transmission delays can be avoided. The synchronization of the nodes is performed at low overhead which is achieved by performing the synchronization when necessary. Further, the method does not require the use of synchronized digital clocks.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for preventing message loss in a controller area network (CAN) system, said CAN system including a plurality of distributed nodes capable of communicating with each other through a CAN bus, each of the plurality of distributed nodes being allocated a task, where the plurality of distributed nodes include at least one node of a first type and at least one node of a second type, said method comprising:
   determining a synchronization frequency;
   sending synchronization frames from the node of the first type to the node of the second type, wherein the synchronization frames are sent at the synchronization frequency; and
   performing a task activation synchronization on the node of the second type based on information included in the synchronization frames, where the task activation synchronization includes modifying a local task period of the node of the second type.

2. The method according to claim 1 wherein determining the synchronization frequency includes modeling the CAN system as a linear hybrid automaton (LHA) and performing an iterative operation on the LHA, wherein the LHA includes a test frequency as a parameter.

3. The method according to claim 2 wherein performing the iterative operation on the LHA includes varying the test frequency by a factor until a condition is met.

4. The method according to claim 3 wherein the condition is fulfilled when a message loss is observed in the LHA.

5. The method according to claim 3 wherein the condition is fulfilled when no message loss is observed in the LHA.

6. The method according to claim 1 wherein the information included in the synchronization frames includes a value of an interval between two instants of time at which successive synchronization frames are sent.

7. The method according to claim 1 wherein each of the plurality of distributed nodes includes a local task period corresponding to the task allocated to it, and wherein the local task period corresponding to one of the plurality of distributed nodes is a time taken by the one of the plurality of distributed nodes to complete the task allocated to it.

8. A method for preventing message loss in a controller-area network (CAN) system, said CAN system including a plurality of distributed nodes capable of communicating with each other through a CAN bus, each of the plurality of distributed nodes being allocated a task, wherein the plurality of distributed nodes include a master node and at least one slave node, said method comprising:
   determining a synchronization frequency;
   sending synchronization frames from the master node to the at least one slave node, wherein the synchronization frames are sent at the synchronization frequency; and
   performing a task activation synchronization on the at least one slave node based on information included in the synchronization frames, where the task activation synchronization comprises modifying a local task period of the at least one slave node.

9. The method according to claim 8 wherein determining the synchronization frequency includes modeling the CAN system as a linear hybrid automaton (LHA) and performing an iterative operation on the LHA, wherein the LHA includes a test frequency as a parameter.

10. The method according to claim 9 wherein performing the iterative operation on the LHA includes varying the test frequency by a factor until a condition is met.

11. The method according to claim 10 wherein the condition is fulfilled when a message loss is observed in the LHA.

12. The method according to claim 10 wherein the condition is fulfilled when no message loss is observed in the LHA.

13. The method according to claim 8 wherein determining the synchronization frequency is performed offline.

14. The method according to claim 8 wherein information included in the synchronization frames includes a value of an interval between two instants of time at which successive synchronization frames are sent.

15. The method according to claim 8 wherein each of the plurality of distributed nodes includes a local task period corresponding to the task allocated to it, and wherein the local task period corresponding to one of the plurality of distributed nodes is a time taken by the one of the plurality of distributed nodes to complete the task allocated to it.

16. A method for preventing message loss in a controller area network (CAN) system, said CAN system including a plurality of distributed nodes capable of communicating with each other through a CAN bus, each of the plurality of distributed nodes being allocated a task, wherein the plurality of distributed nodes includes a master node and at least one slave node, said method comprising:
   determining a synchronization frequency where the synchronization frequency is a frequency at which the master node sends a synchronization frame to the at least one slave node; and
   performing task activation synchronization on the at least one slave node based on the information included in the synchronization frame, where the task activation synchronization includes modifying a local task period of the at least one slave node.

17. The method according to claim 16 wherein determining the synchronization frequency includes modeling the CAN system as a linear hybrid automaton (LHA) and performing an iterative operation on the LHA, wherein the LHA includes a test frequency as a parameter.

18. The method according to claim 16 wherein information included in the synchronization frames includes a value of an interval between two instants of time at which successive synchronization frames are sent.

* * * * *